United States Patent [19]

Pfaff

[11] Patent Number: 5,075,952
[45] Date of Patent: Dec. 31, 1991

[54] METHOD OF CLADDING PITCHED CABLE

[75] Inventor: Martin Pfaff, Ehringshausen-Dreisbach, Fed. Rep. of Germany

[73] Assignee: Meflex Telecontrol GmbH, Ehringshausen, Fed. Rep. of Germany

[21] Appl. No.: 554,532

[22] Filed: Jul. 19, 1990

[30] Foreign Application Priority Data

Jul. 20, 1989 [DE] Fed. Rep. of Germany ....... 3924121

[51] Int. Cl.$^5$ .............................................. B23D 39/00
[52] U.S. Cl. ....................................... 29/517; 29/520; 57/3; 57/223
[58] Field of Search ................. 29/517, 520, DIG. 19, 29/419.1, 557, 728, 235; 57/3, 7, 210, 223, 6, 9, 906, 232, 238, 138, 212, 217, 221, 295, 309, 311; 51/281 R, 289 R; 72/340

[56] References Cited

U.S. PATENT DOCUMENTS 4,338,772 7/1982 Rendell ..................................... 57/9
4,625,504 12/1986 Burghardt ............................. 57/223

Primary Examiner—Joseph M. Gorski
Assistant Examiner—S. Thomas Hughes
Attorney, Agent, or Firm—Longacre & White

[57] ABSTRACT

A method of cladding a reduced diameter portion of a cable wherein the reduced diameter portion is created by grinding the external surfaces of the cable. The cladding is placed around the reduced diameter portion of the cable and is likewise reduced in diameter by rolling, hammering, or other external force. In this manner, a cable cladding can be accomplished without adversely effecting the flexibility of the length of cable.

6 Claims, 1 Drawing Sheet

METHOD OF CLADDING PITCHED CABLE

FIELD OF THE INVENTION

This invention relates to a method of placing cladding around a length of pitched cable. More particularly, this invention relates to a method of placing cladding around a length of pitched cable which has been reduced in diameter by grinding the pitch elements around the cable.

BACKGROUND OF THE INVENTION

This invention is an improvement on a previous patented cladding method for pitched cable lengths, see U.S. Pat. No. 4,625,504. In this prior patent, a cladding is placed around a length of pitched cable wherein the diameter of the pitch element around the main cable portion had been reduced by hammering.

While this method resulted in an overall satisfactorily sized sheathed cable section, the stiffness of the cable in this cladded section increased owing to the increased density of the cable at this section. Owing to the fact that the cable is meant for flexible movement in yet another larger surrounding sheath, this lack of flexibility along certain segments is undesirable.

The object of the present invention is to reduce the overall diameter of a pitched cable, clad the reduced diameter section, and retain uniform flexibility through the length of the cable.

SUMMARY OF THE INVENTION

To solve the problem created by the prior hammering reduction of the diameter of the pitched cable section, the present method of reducing the diameter of the pitch of the cable is achieved by grinding the pitch element of the cable until sufficient diametric bulk has been removed. The cable length is then clad using a known method, i.e., placing a plastic tube around the section and hammering the tube onto the cable. Owing to the plastic cladding placed around the cable section, the ill effects of the hammer blows are not transferred to the underlying cable.

Another method of cladding the reduced diameter cable section is to extrude a plastic tube onto the cable directly. The cable may be passed through an extruder die, and the die may operate only when the reduced section of cable is passing through the die.

Another method of cladding the cable includes placing a length of plastic tube around the reduced diameter cable length and compression rolling the plastic onto the cable.

The object of attaching the cladding to the cable being to firmly affix the cladding in position along the cable length.

DETAILED DESCRIPTION OF THE PREFERRED EMBODIMENT

Figure 1:
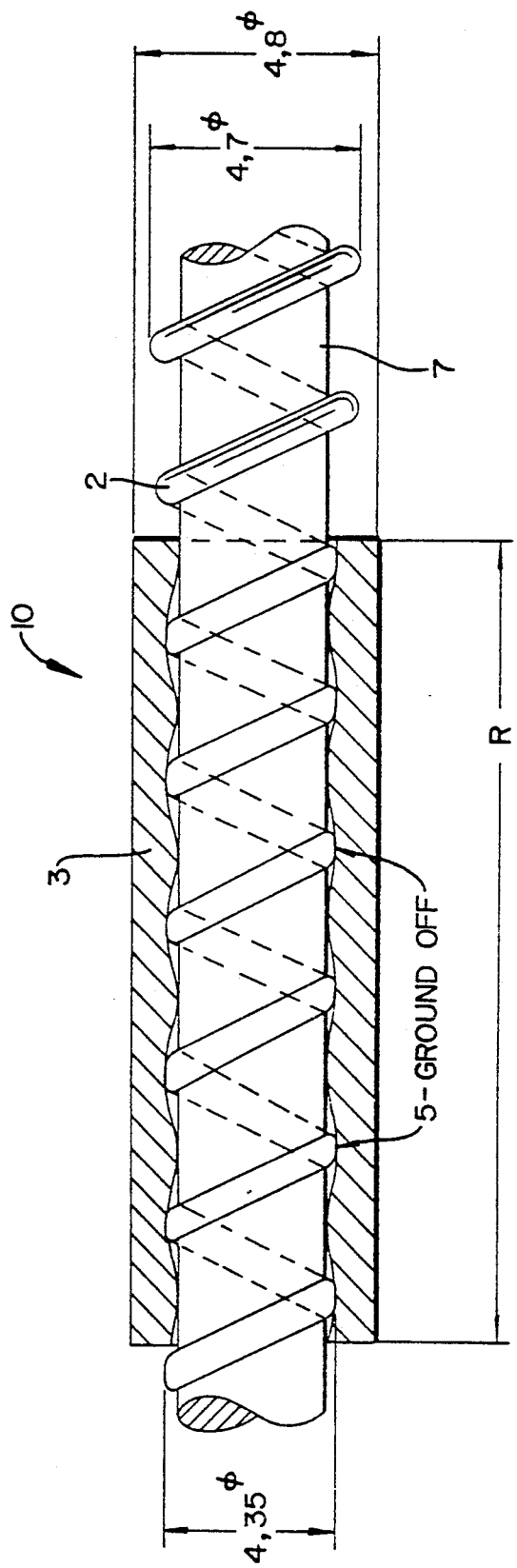
FIG. 1 is a partial sectional view of a cable length according to the present invention having a portion thereof reduced in diameter and clad according to the present method.

The cable 10 is shown in the FIG. 1 as having a main body portion 1, and a pitch portion 2 wrapped around the body portion 1 in a helical manner. The diameter of the pitch portion of the cable is for example 4.7 mm.

For purposes of attaching a cladding tube around the cable 10, a length of cable R has the pitch elements therealong ground off by a grinding machine to a reduced diameter as shown at 5. The diameter of the reduced section can be for example 4.35 mm. A cladding tube 3 made of plastic, resin, or the like, having an overall diameter of 5.5 mm and an inner diameter of 4.5 mm, is then placed around the reduced diameter length of cable R. The overall diameter of the tube 3 is then reduced by the application of an external force, e.g., hammer blows, roller pressure, heat, etc. In this manner, the external diameter of the cladding 3 is reduced to 4.8 mm.

Owing to the reduced outer diameter of the cladding 3, the cladding tube is now firmly affixed to the remaining helix elements of the pitch portion 2 along the reduced diameter portion of the cable 10. The cable is now clad at selected locations with a cladding element only slightly larger in diameter than the diameter of the pitch portion of the cable. The cable 10 can operate in a surrounding guide tube with uniform flexibility throughout.

The cable 10 may also be coated throughout by an electrostatically applied thin plastic film. A plastic film may also be applied by a coating and sintering process. This coating may be applied prior to the grinding and placing of the cladding 3.

Additionally, a flocked thread may be wound between the helical turns of pitch portion 2.

While the preferred embodiment of the present invention has been described herein, the invention is not to be limited in scope except as by the following claims.

I claim:

1. A method of cladding a reduced diameter portion of a length of pitched cable, said cable having a periphery and a diameter defined as the largest cross sectional dimension of the cable and pitching surrounding said cable, said pitching being comprised of pitch elements surrounding the entire periphery said cable at regular intervals therealong, said method comprising the steps of:
    reducing the diameter of a selected length of said pitched cable by grinding off outer surfaces of the pitch elements of said cable along the entire periphery of said cable in said selected length;
    placing a corresponding length of cladding around said selected length;
    affixing said cladding to said selected length so that said cladding is longitudinally immovable along said cable; wherein,
    said selected length of cable with cladding affixed thereto has flexibility characteristics similar to flexibility characteristics of unclad lengths of said cable.

2. The method of claim 1, wherein:
    said affixing step comprises exerting roller pressure onto outer surfaces of said cladding and forcing said cladding to reduce in diameter around said selected length of cable thereby securely affixing said cladding to said cable.

3. The method of claim 1, wherein:
    said affixing step comprises hammering hammer blows against an outer surface of said cladding thereby forcing said cladding to reduce in diameter around said selected length of cable thereby securely affixing said cladding to said cable.

4. The method of claim 1, wherein:

said placing and affixing steps are accomplished by passing said cable through an extruder, and extruding a cladding onto said selected length.

5. A method as in claim 1, further comprising: electrostatically coating a layer of plastic to said cable.

6. The method of claim 1, wherein:
said cable has a flocked thread therealong.

* * * * *